US010974749B2

(12) United States Patent
Kuhl et al.

(10) Patent No.: US 10,974,749 B2
(45) Date of Patent: Apr. 13, 2021

(54) TROLLEY AND METHOD FOR MOVING LONG PALLETS

(71) Applicant: OVERHEAD DOOR CORPORATION, Lewisville, TX (US)

(72) Inventors: Bruce Kevin Kuhl, Grand Island, NE (US); Samuel T. Womack, Wooster, OH (US); Kent Kaiser, Grand Island, NE (US); Douglas G. Tank, Wood River, NE (US); Jamye Lee Sautter, Grand Island, NE (US); Jordan Ly'Ron Pearson, Grand Island, NE (US); Jason Peterson, Grand Island, NE (US)

(73) Assignee: OVERHEAD DOOR CORPORATION, Lewisville, TX (US)

( * ) Notice: Subject to any disclaimer, the term of this patent is extended or adjusted under 35 U.S.C. 154(b) by 70 days.

(21) Appl. No.: 15/960,313

(22) Filed: Apr. 23, 2018

(65) Prior Publication Data

US 2019/0322300 A1 Oct. 24, 2019

(51) Int. Cl.
*B62B 3/00* (2006.01)
*B62B 3/10* (2006.01)
*B62B 5/00* (2006.01)

(52) U.S. Cl.
CPC ............. *B62B 3/006* (2013.01); *B62B 3/00* (2013.01); *B62B 3/001* (2013.01); *B62B 3/10* (2013.01); *B62B 5/0083* (2013.01); *B62B 2301/02* (2013.01)

(58) Field of Classification Search
CPC ...... B62B 5/0083; B62B 5/0086; B62B 11/00; B62B 2207/04; B62B 3/00; B62B 3/10
See application file for complete search history.

(56) References Cited

U.S. PATENT DOCUMENTS

| 1,063,620 | A |   | 6/1913  | Thornley |
| 1,129,775 | A |   | 2/1915  | Anthony |
| 1,355,173 | A |   | 10/1920 | Shadel et al. |
| 2,379,476 | A |   | 7/1945  | Cleveland |
| 2,511,073 | A |   | 6/1950  | McCandless |
| 2,537,909 | A |   | 1/1951  | Puddester |
| 2,550,219 | A | * | 4/1951  | Bollinger .............. B62B 5/0083 280/479.1 |

(Continued)

FOREIGN PATENT DOCUMENTS

| DE | 19809331 | 5/1999 |
| EP | 666209   | 8/1996 |

(Continued)

*Primary Examiner* — James Keenan
(74) *Attorney, Agent, or Firm* — Haynes and Boone, LLP

(57) ABSTRACT

A pallet trolley includes: a frame having two ends, the frame defining a longitudinal axis; a handle assembly attached to the frame; a first wheel assembly attached to the frame at one end; and a second wheel assembly attached to the frame at the other end, the first and second wheel assemblies are oriented to allow the pallet trolley to roll in a direction other than parallel to the longitudinal axis of the frame. A method of moving a pallet includes: providing a pallet trolley having first and second wheel assemblies; locating the first and second wheel assemblies under a pallet; lowering the pallet onto the trolley; and moving the pallet on the trolley and a fork truck.

17 Claims, 6 Drawing Sheets

(56) References Cited

U.S. PATENT DOCUMENTS

| | | | | |
|---|---|---|---|---|
| 2,733,929 | A | * | 2/1956 | Edixon .............. B62B 5/0083 280/35 |
| 2,783,055 | A | | 2/1957 | Michaud |
| 2,812,189 | A | | 11/1957 | Geldhof |
| 2,843,392 | A | | 7/1958 | Simpkins |
| 2,879,885 | A | | 3/1959 | Simmons |
| 3,054,623 | A | | 9/1962 | Simpkins |
| 3,216,531 | A | | 11/1965 | Hutchinson |
| 3,288,481 | A | * | 11/1966 | Meyers ............... B62B 3/04 280/47.27 |
| 3,356,185 | A | | 12/1967 | Isaacks |
| 3,422,929 | A | | 1/1969 | Oja et al. |
| 3,710,895 | A | | 1/1973 | Freedman |
| 3,942,813 | A | * | 3/1976 | Dombroski .......... B62B 1/14 280/47.131 |
| 4,016,819 | A | | 4/1977 | Cowling |
| 4,073,369 | A | | 2/1978 | Nordskog |
| 4,135,725 | A | * | 1/1979 | DiRoma ............. B62B 5/0083 16/30 |
| 4,213,624 | A | | 7/1980 | Sanders |
| 4,313,612 | A | | 2/1982 | Rubens |
| 4,417,738 | A | | 11/1983 | Kendall |
| 4,471,969 | A | | 9/1984 | Zabala et al. |
| 4,753,419 | A | | 6/1988 | Johansson |
| 4,874,182 | A | | 10/1989 | Clark |
| 4,886,286 | A | | 12/1989 | Whorton, III |
| 4,902,026 | A | | 2/1990 | Maldonado |
| 4,921,264 | A | * | 5/1990 | Duffy ................. B62B 5/0083 108/55.3 |
| 5,113,960 | A | | 5/1992 | Prinz |
| 5,193,828 | A | | 3/1993 | Benvenuti |
| 5,257,794 | A | | 11/1993 | Nakamura |
| 5,316,434 | A | * | 5/1994 | Martin ............... B66F 9/18 414/458 |
| 5,486,014 | A | * | 1/1996 | Hough ............... B62B 5/0083 24/535 |
| 5,514,118 | A | | 5/1996 | Kummer et al. |
| 5,551,715 | A | | 9/1996 | Pickard |
| 5,584,639 | A | | 12/1996 | Walker, Jr. |
| 5,628,522 | A | | 5/1997 | Hall |
| 5,752,584 | A | | 5/1998 | Magoto et al. |
| 5,819,671 | A | | 10/1998 | Ocampo |
| 5,829,947 | A | | 11/1998 | Litten |
| 5,845,914 | A | | 12/1998 | Lenkman |
| 5,879,014 | A | * | 3/1999 | Price ................. B62B 3/02 280/47.18 |
| 5,890,562 | A | | 4/1999 | Bartels et al. |
| 5,890,695 | A | | 4/1999 | Brewer, III |
| 5,927,731 | A | * | 7/1999 | Clarke ............... E04F 21/0023 280/47.24 |
| 5,938,217 | A | | 8/1999 | Wintz |
| 6,120,045 | A | | 9/2000 | Rosko |
| 6,179,087 | B1 | | 1/2001 | Moffat |
| 6,286,630 | B1 | | 9/2001 | Obergfell |
| 6,390,759 | B1 | | 5/2002 | Novak et al. |
| 6,450,515 | B1 | | 9/2002 | Guth |
| 6,860,496 | B2 | | 3/2005 | Novak et al. |
| 7,124,859 | B2 | * | 10/2006 | Doerflinger .......... B60T 7/102 188/19 |
| 7,165,776 | B2 | | 1/2007 | Quinlan, Jr. et al. |
| 7,462,009 | B2 | | 12/2008 | Hartmann et al. |
| 7,513,479 | B2 | | 4/2009 | Li |
| 7,537,222 | B2 | | 5/2009 | Hadar |
| 7,891,675 | B2 | | 2/2011 | Dobra et al. |
| 8,002,293 | B2 | * | 8/2011 | Lear ................. B62B 3/008 280/47.34 |
| 8,006,985 | B2 | | 8/2011 | Facey et al. |
| 8,016,300 | B2 | | 9/2011 | Cramer et al. |
| 8,246,059 | B2 | | 8/2012 | Gass et al. |
| 8,292,309 | B2 | | 10/2012 | Fan et al. |
| 8,403,344 | B2 | | 3/2013 | Carver et al. |
| 8,511,693 | B2 | | 8/2013 | Gass et al. |
| 8,657,246 | B2 | | 2/2014 | Ma |
| 8,672,287 | B2 | | 3/2014 | Li |
| 8,752,489 | B2 | | 6/2014 | Linares |
| 8,833,709 | B2 | | 9/2014 | Weng |
| 8,851,093 | B2 | | 10/2014 | Li |
| 8,888,110 | B2 | | 11/2014 | Sadeh et al. |
| 8,919,361 | B2 | | 12/2014 | Ma |
| 8,960,625 | B2 | | 2/2015 | Ma |
| 9,045,253 | B2 | | 6/2015 | Hacko et al. |
| 10,035,530 | B2 | * | 7/2018 | Adams ............... B62B 5/0083 |
| 10,245,885 | B2 | * | 4/2019 | Davis ................. B60B 33/0023 |
| 2002/0113390 | A1 | * | 8/2002 | Hallman ............. B62B 3/108 280/79.7 |
| 2003/0213878 | A1 | | 11/2003 | Stahl |
| 2006/0232034 | A1 | * | 10/2006 | Skiles ................ B62B 3/02 280/79.2 |
| 2007/0186827 | A1 | | 8/2007 | Loftus et al. |
| 2008/0012260 | A1 | | 1/2008 | Ouyang et al. |
| 2008/0056871 | A1 | | 3/2008 | Morgan et al. |
| 2008/0107511 | A1 | * | 5/2008 | Oberg ............... B62B 1/06 414/445 |

FOREIGN PATENT DOCUMENTS

| | | | |
|---|---|---|---|
| EP | 1176079 | 1/2002 | |
| EP | 1362794 | 11/2003 | |
| EP | 1524170 | 4/2005 | |
| EP | 2103491 | 9/2009 | |
| JP | 2000238777 | 9/2000 | |
| NL | 1009240 C1 * | 8/1998 | ........ B62B 5/0083 |
| WO | WO-2004080780 | 9/2004 | |
| WO | WO-2005080214 | 9/2005 | |
| WO | WO-2007028194 | 3/2007 | |

* cited by examiner

TROLLEY AND METHOD FOR MOVING LONG PALLETS

TECHNICAL FIELD

This patent disclosure relates generally to a pallet trolley and method of moving a pallet using a pallet trolley and, more particularly, to a pallet trolley for moving long pallets that sag as they are lifted by a fork truck.

BACKGROUND

Pallets have long been used as a platform upon which freight is loaded. The pallet provides openings that allow the forks of a fork truck to enter the pallet and thereby lift the pallet and load of freight together. Many pallets are rectangular in shape and while not all the sides are necessarily of the same length, they may be similar in length. Fork trucks excel at lifting and moving such pallets.

However, some pallets are designed for elongated loads. Such pallets have two sides much longer than the other two sides. These pallets have two relatively short ends and two long sides. Fork trucks often lift and move such pallets by inserting the forks in one of the short ends and then attempt lift the pallet and load by raising the forks. Sometimes that pallets are so heavy and long, that the unsupported end of the pallet will sag significantly when the pallet is lifted and moved. Such sagging may result in the pallet being more difficult to move than a typical load. The pallet may need to be lifted higher than what is typically desired in order for the sagging end to clear the ground or other low obstacles. In extreme cases, sagging of the unsupported end of the pallet may cause handlers to partially unload the pallet before movement of the pallet for fear of breaking the pallet during a movement operation.

An apparatus and method of moving long pallets is desired to alleviate the difficulties mentioned above and other difficulties when moving and lifting long pallets.

SUMMARY

The foregoing needs are met to a great extent by embodiments in accordance with the present disclosure, wherein in some embodiments, provides an apparatus and method of moving long pallets to alleviate the difficulties mentioned above and other difficulties when moving and lifting long pallets.

In one aspect, the disclosure describes a pallet trolley. The pallet trolley includes: a frame having two ends, the frame defining a longitudinal axis; a handle assembly attached to the frame; a first wheel assembly attached to the frame at one end; and a second wheel assembly attached to the frame at the other end, the first and second wheel assemblies are oriented to allow the pallet trolley to roll in a direction other than parallel to the longitudinal axis of the frame.

In another aspect, the disclosure describes a method of moving a pallet. The method includes: providing a pallet trolley having: a frame having two ends, the frame defining a longitudinal axis; a handle assembly attached to the frame; a first wheel assembly attached to the frame at one end; a second wheel assembly attached to the frame at the other end, the first and second wheel assemblies are oriented to allow the pallet trolley to roll in a direction other than parallel to the longitudinal axis of the frame; locating the first and second wheel assemblies under a pallet; lowering the pallet onto the trolley; and moving the pallet on the trolley and a fork truck.

In yet another aspect, the disclosure describes a pallet trolley. The pallet trolley including: a frame having two ends, the frame defining a longitudinal axis; a handle assembly attached to the frame; a first wheel assembly attached to the frame at one end; a second wheel assembly attached to the frame at the other end, the first and second wheel assemblies are oriented to allow the pallet trolley to roll in a direction substantially perpendicular to the longitudinal axis of the frame; and a first and second support plate located over the first and second wheel assemblies respectively.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Additional features, advantages, and aspects of the disclosure may be set forth or apparent from consideration of the following detailed description, drawings, and claims. Moreover, it is to be understood that both the foregoing summary of the disclosure and the following detailed description are exemplary and intended to provide further explanation without limiting the scope of the disclosure as claimed.

BRIEF DESCRIPTION OF THE DRAWINGS

The accompanying drawings, which are included to provide a further understanding of the disclosure, are incorporated in and constitute a part of this specification, illustrate aspects of the disclosure and together with the detailed description serve to explain the principles of the disclosure. No attempt is made to show structural details of the disclosure in more detail than may be necessary for a fundamental understanding of the disclosure and the various ways in which it may be practiced. In the drawings.

DETAILED DESCRIPTION

Figure 1:
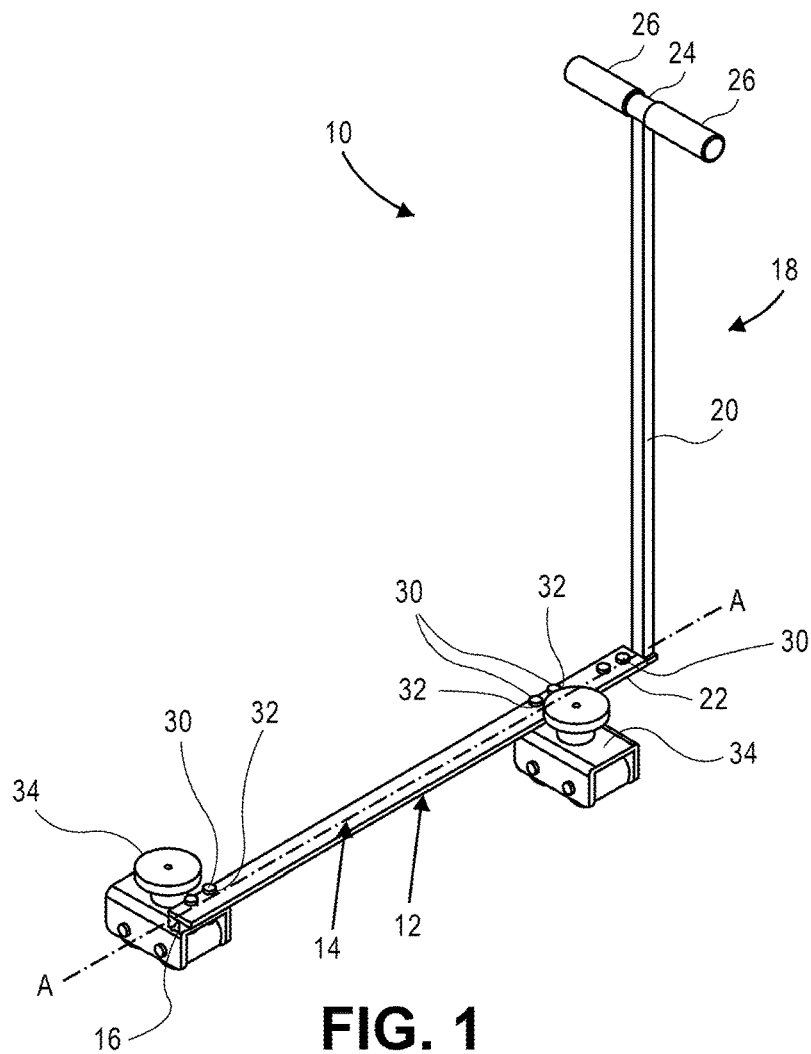
FIG. 1 is a perspective view of a pallet trolley in accordance with one embodiment in accordance with this disclosure.

The aspects of the disclosure and the various features and advantageous details thereof are explained more fully with reference to the non-limiting aspects and examples that are described and/or illustrated in the accompanying drawings and detailed in the following description. It should be noted that the features illustrated in the drawings are not necessarily drawn to scale, and features of one aspect may be employed with other aspects as the skilled artisan would recognize, even if not explicitly stated herein. Descriptions of well-known components and processing techniques may be omitted so as to not unnecessarily obscure the aspects of the disclosure. The examples used herein are intended merely to facilitate an understanding of ways in which the disclosure may be practiced and to further enable those of skill in the art to practice the aspects of the disclosure. Accordingly, the examples and aspects herein should not be construed as limiting the scope of the disclosure, which is defined solely by the appended claims and applicable law. Moreover, it is noted that like reference numerals represent similar parts throughout the several views of the drawings.

FIGS. 1-4 are perspective, top, front, and left side views of a pallet trolley 10 in accordance with the present disclosure. The pallet trolley 10 has a horizontal frame 12. In the embodiment shown, the horizontal frame 12 includes a flat portion 14 and a tube portion 16 located under the flat portion 14. The horizontal frame 12 has a longitudinal axis A-A. A handle assembly 18 is attached to the frame 12. The handle assembly 18 is useful to allow a user to move the pallet trolley 10 to a desired position. Also visible are distance D1 between elements 18 and 34, distance D2 between elements 34 and 34, and distance D3 between element 26 and the bottom of element 34.

Figure 5:
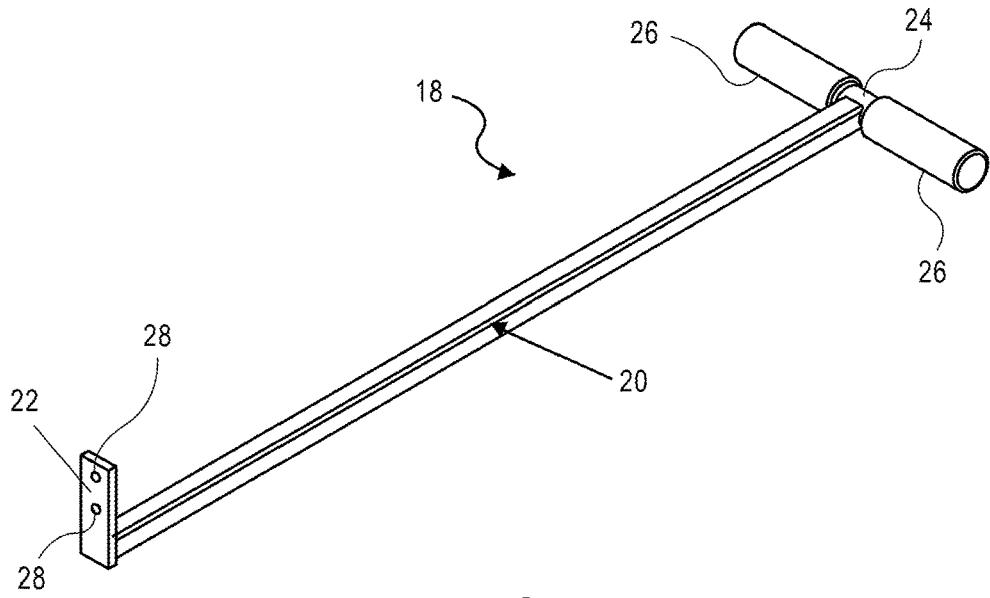
FIG. 5 is a perspective view of a handle assembly of the pallet trolley of FIG. 1.
Figure 8:
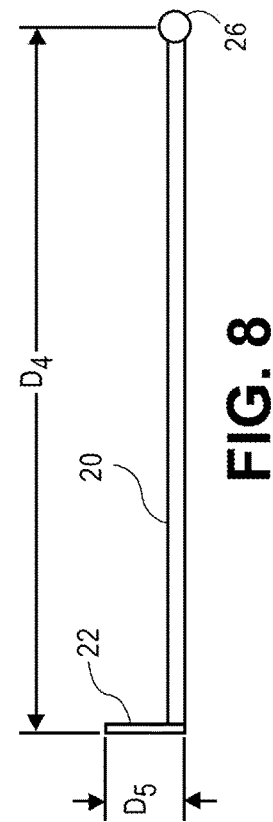
FIG. 8 is a right side view of the handle assembly of FIG. 5.
Figure 6:
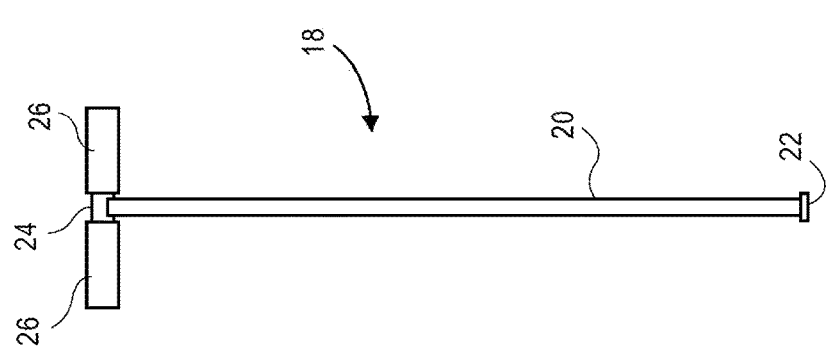
FIG. 6 is a front view of the handle assembly of FIG. 5.
Figure 7:
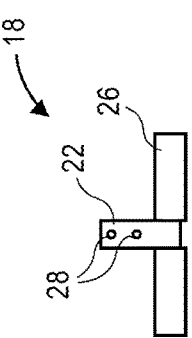
FIG. 7 is a top view of the handle assembly of FIG. 5.

As shown in FIGS. 1-8, but best shown in FIG. 5, the handle assembly 18 includes a handle tube 20. A handle flat section 22 extends from the handle tube 20 at one end and a handle grip tube 24 is attached to the other end of the handle tube 20. The grip tube 24 is equipped with grips 26. The grips 26 may be made of a resilient material, be similar to bicycle grips, and slide onto the grip tube 24. The flat section 22 has attaching holes 28 that allow the handle assembly 18 to attach to the frame 12 with fasteners 30 that extend through the frame 12 and handle flat section 22. The fasteners 30 may be threaded and mate with threaded holes or nuts may be used to secure the fasteners 30. In other embodiments, the handle assembly 18 may attach to the frame 12 in other ways such as welding or other suitable ways. Also visible is distance D4 between the flat section 22 and the grips 26. D5 in FIG. 8 represents a length of the flat section 22.

Figure 2:
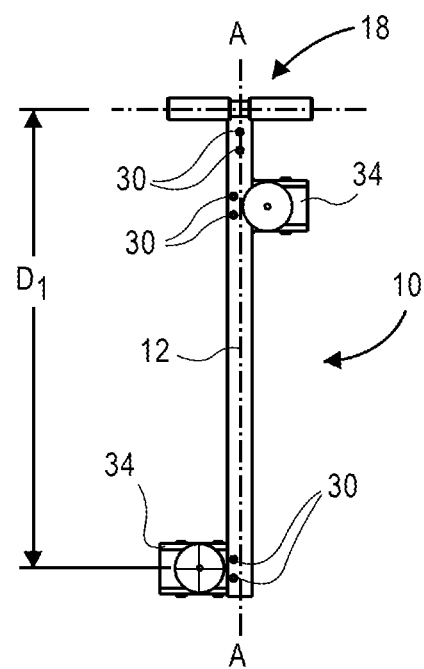
FIG. 2 is a top view of the pallet trolley of FIG. 1.
Figure 4:
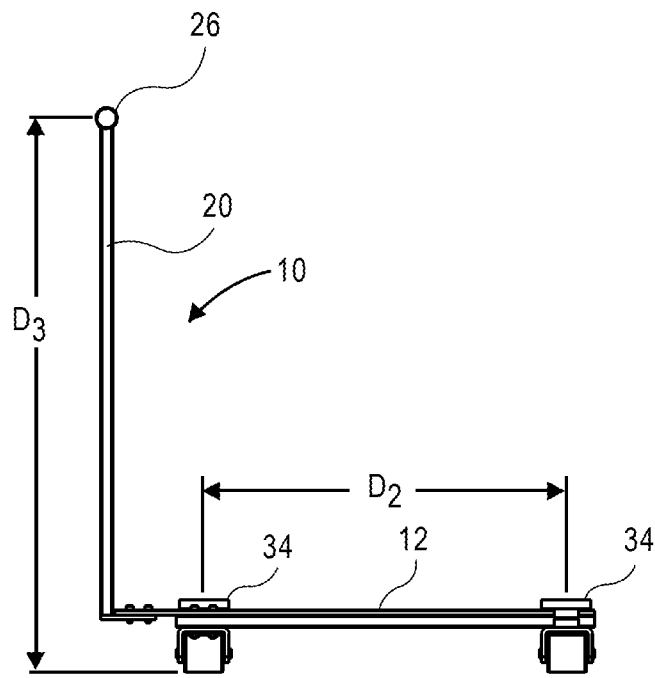
FIG. 4 is a left side view of the pallet trolley of FIG. 1.
Figure 3:
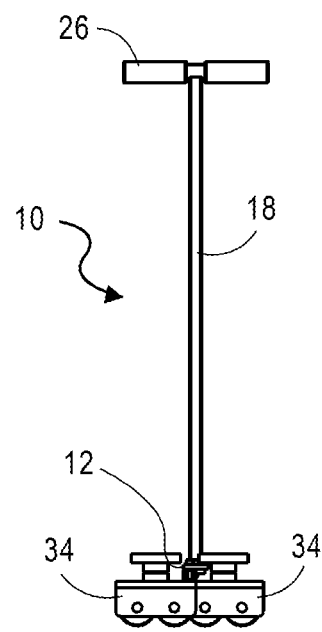
FIG. 3 is a front view of the pallet trolley of FIG. 1.

As shown in FIGS. 1, 2-3, fasteners 30 are also used to extend through holes 32 in the frame 12 to attach a trolley assembly 34 to the frame 12. In other embodiments, the trolley assembly 34 may attach to the frame 12 in other ways such as welding or other suitable ways.

Figure 9:
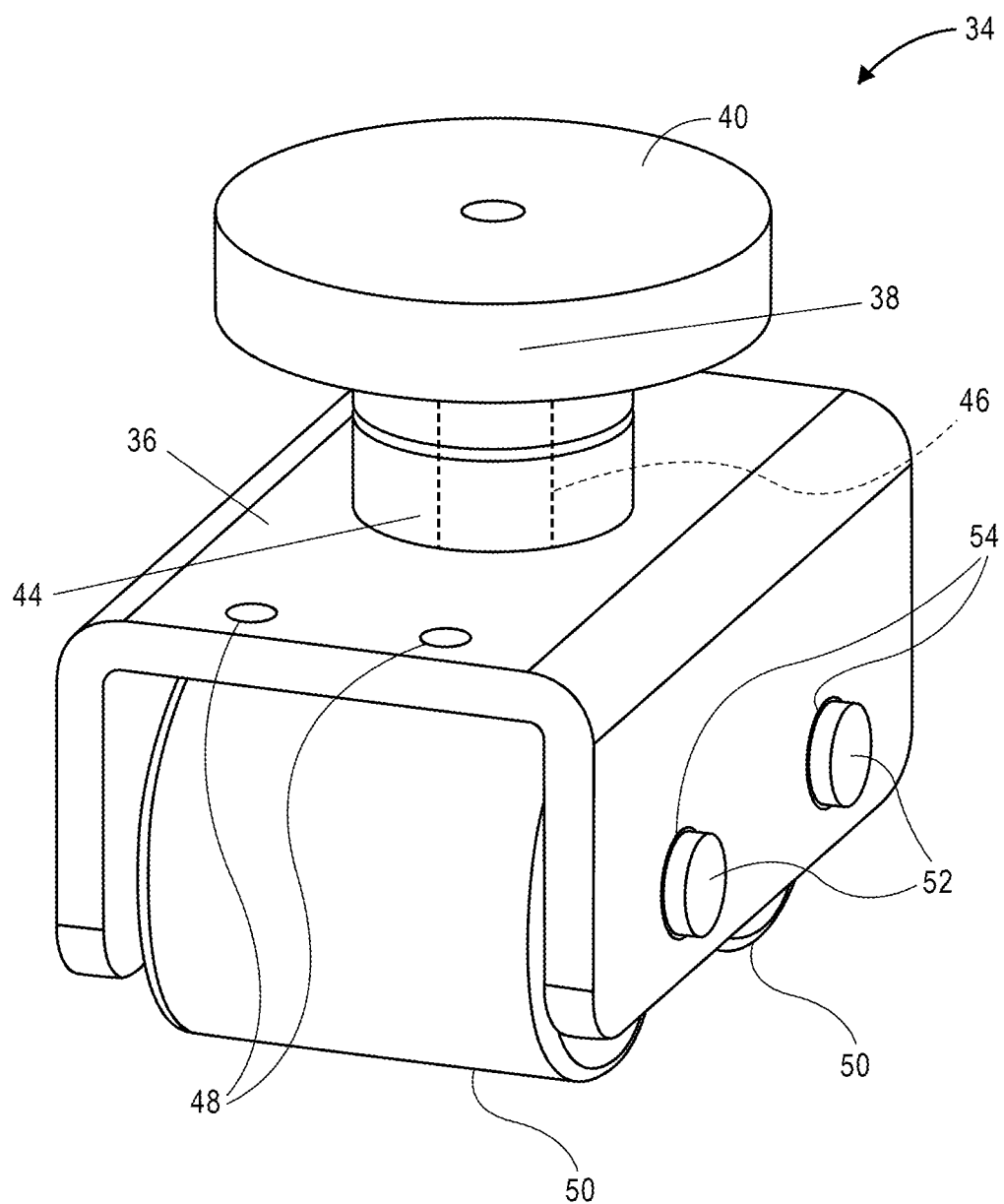
FIG. 9 is a perspective view of one of the wheel assemblies of the trolley of FIG. 1.

FIG. 9 is a perspective view of an example trolley assembly 34 that maybe be used in accordance with the disclosure. The trolley assembly 34 includes a trolley bracket 36 that supports a support plate 38 that defines a support surface 40. The support plate 38 is the structure that supports a pallet when a pallet is being supported by the pallet trolley 10. The support plate 38 is connected via a collet 44 and internal support bolt 46 (shown in dashed lines to indicate that it is an internal component in the embodiment of FIG. 9) to the trolley bracket 36.

There are attaching holes 48 in the trolley bracket 36 to allow the trolley assembly 34 to attach to the frame 12 via fasteners 30 as shown in FIG. 1. In embodiments where the attaching holes 48 are threaded, the fasteners 30 may not need nuts. Where the fasteners 30 use nuts to secure the trolley assembly 34 to the frame 12, the attaching holes 48 may be smooth and not threaded.

In some embodiments, and as shown in the FIGS., the trolley assembly 34 may include multiple wheels 50. Other embodiments may only include a single wheel 50 per trolley assembly 34. The wheels 50 (or wheel 50) attach to the bracket 36 with an axle 52 that may extend through axle holes 54 in the trolley bracket 36. The wheels 50 are oriented to allow the pallet trolley 10 roll at an angle with respect to the longitudinal axis A-A (see FIG. 1) of the pallet trolley 10. In some embodiments, the pallet trolley 10 does not (and cannot) roll in a direction parallel to the longitudinal axis A-A. In some embodiments, the wheels 50 are oriented to allow the pallet trolley 10 to move at right angle or 90 degrees with respect to the longitudinal axis A-A.

In some embodiments (best shown in FIGS. 1 and 2), the trolley assemblies 34 are located on opposite sides of the longitudinal axis A-A. This orientation of the trolley assemblies 34 may provide some advantages such as giving the pallet trolley 10 more stability and allow the pallet trolley 10 to stand unsupported on its own when it is not loaded. In some embodiments, portions of the trolley assemblies 34 are located under, and on both sides of the longitudinal axis A-A, most of the trolley assembly 34 may be located on one side of the longitudinal axis A-A or the other. For example, in some embodiments 60% or more of the trolley assembly 34 may be located on one side of the axis A-A and at least 60% of the other trolley assembly 34 may be located on the other side of the the axis A-A. In other embodiments at least 70%, 80% or 90% of the trolley assembly 34 is located on one side of the other of the axis A-A. These percentage determinations may be made by the centroid of the trolley assembly 34 or by mass of the trolley assembly 34.

Similarly to the trolley assembly 34 being located on one side or the other of the axis A-A, the support plates 38 may be located on one side or the other of the axis A-A. For example, in some embodiments 60% or more of the support plate 38 may be located on one side of the axis A-A and at least 60% of the other support plate 38 may be located on the other side of the the axis A-A. In other embodiments at least 70%, 80%, or 90% of the support plate 38 is located on one side or the other of the axis A-A. These percentage determinations may be made by the surface area of the support plate 38 or by mass of the support plate 38.

In other embodiments, the trolley assemblies 34 and/or support plates 38 may be more centered on the axis A-A and the two trolley assemblies 34 and/or support plates 38 may be more aligned with each other and the axis A-A rather than being primarily located more to one side or the other. In some embodiments, the support plates 38 may be aligned (or more closely aligned) with the axis A-A even when the trolley assemblies 34 are not. This may be accomplished by moving where the support plates 38 are mounted on the trolley assemblies 34, using angled or curved mounts to mount the support plates on the trolley assemblies 34, or by other suitable methods.

Figure 10:
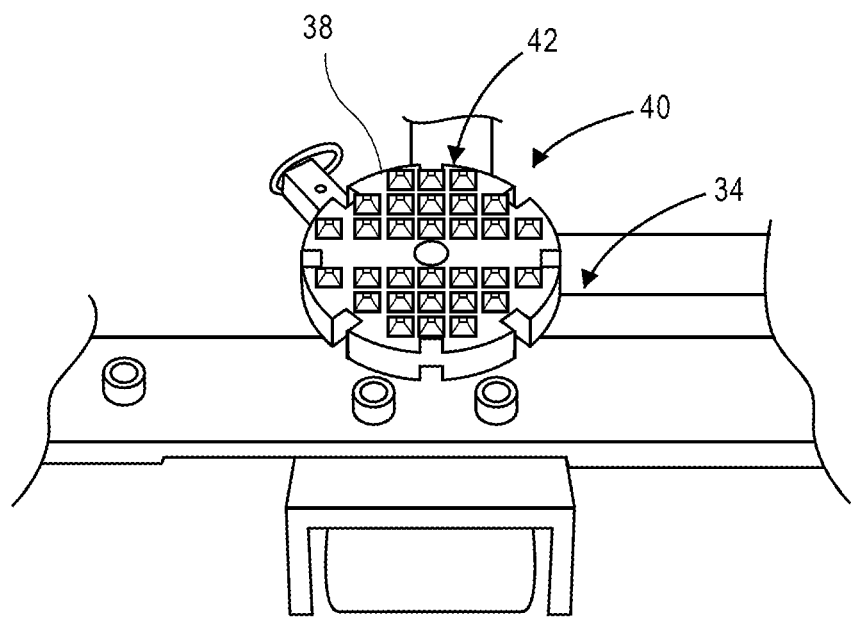
FIG. 10 is a partial perspective view of a wheel assembly having a gripping top surface.

FIG. 10 shows an alternate embodiment where the support plate 38 of the trolley assembly 34 is equipped with gripping projections 42 that extend from the support plate surface 40. The gripping projections 42 help to hold a pallet in place when a pallet is placed on the pallet trolley 10. Pallets are typically made of soft wood. The gripping projections 42 will dig into the soft wood pallet and help hold the pallet in place when a loaded pallet is placed on the pallet trolley 10.

Figure 11:
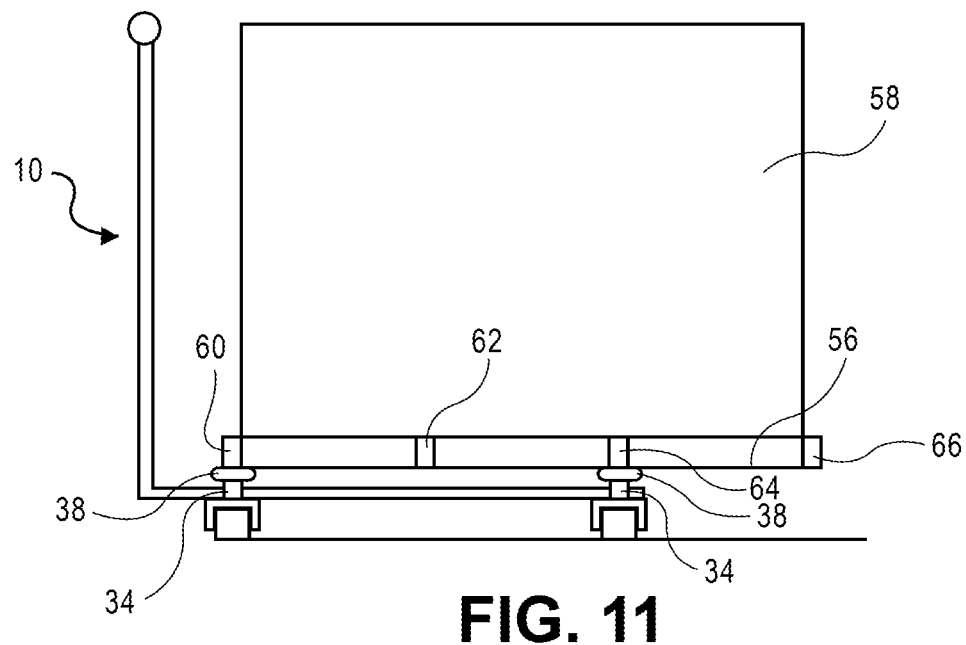
FIG. 11 is a left side view of the pallet trolley with a pallet loaded on the trolley.
Figure 12:
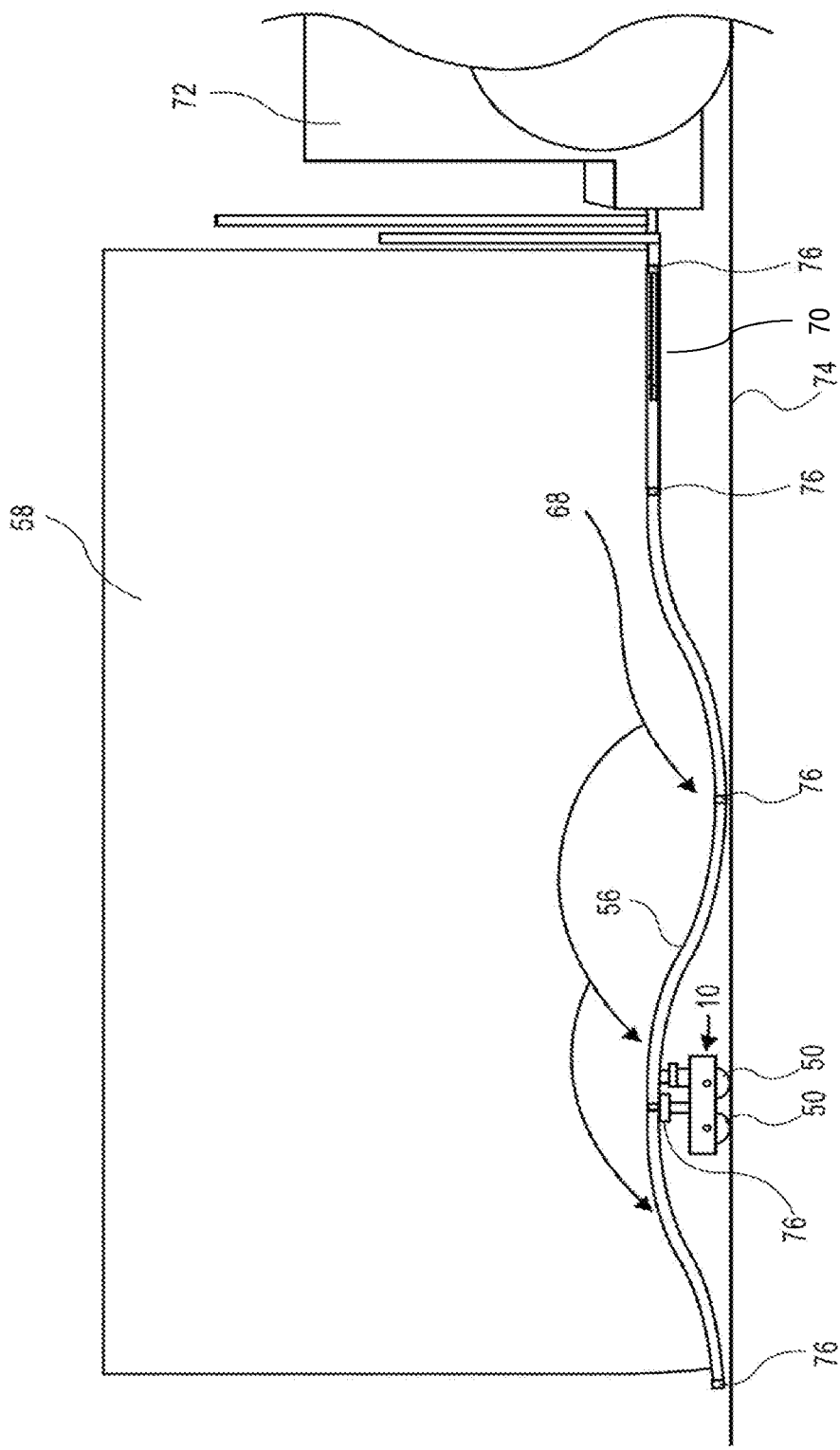
FIG. 12 is a side view of a long pallet loaded on both fork truck and a pallet trolley in accordance with the present disclosure.

FIGS. 11 and 12 show a loaded pallet 56 on the pallet trolley 10. FIG. 11 is a side view of the pallet trolley 10 and an end view of the pallet 56. A load 58 is on the pallet 56. In the example pallet 56 shown, the pallet 56 has a first longitudinal strut 60, a second longitudinal strut 62, a third longitudinal strut 64, and a fourth longitudinal strut 66. It will be understood that other pallets may have more or fewer longitudinal struts and may be used with the pallet trolley 10. The pallet 56 raised, usually with a fork truck, and the pallet trolley 10 is positioned under the pallet 56 such that the support plates 38 are positioned under under a portion of the pallet 56 that can appropriately rest on the support plates 38. In some embodiments, each support plate 38 is located under one of the longitudinal struts 60, 62, 64, and 66. In instances where the pallet 56 has four longitudinal struts 60, 62, 64, and 66 the support plates 38 may be positioned under longitudinal struts 60 and 64 as shown in FIG. 11. Once the pallet trolley 10 is in the desired position, the pallet 56 is lowered onto the pallet trolley 10.

FIG. 12 is a side view of pallet 56 with a load 58. The pallet 56 includes longitudinal struts 76, and is shown to sag 68 in an exaggerated manner for illustrative purposes. Forks 70 from a fork truck 72 have lifted the pallet 56 off of the ground 74. As mentioned above, large, heavy pallets 56 may sag so that a fork truck 72 must lift the pallet 56 high enough to clear the ground 74. By using the pallet trolley 10 to help support the end of the pallet 56 opposite the end of the pallet 56 where the forks 70 are lifting the pallet 56, the pallet 56 need not be lifted so high to clear the ground 74. Further, the pallet 56 is supported in more places. The pallet 56 may be moved while supported by the pallet trolley 10 due to the wheels 50 on the pallet trolley 10.

In some embodiments, the fork truck 72 may move the loaded pallet 56 and the pallet trolley 10 may move along with the loaded pallet 56 due to the adhesion between the pallet 56 and the pallet trolley 10 due do the weight of the loaded pallet 56 and/or the gripping projections 42 (see FIG. 10). In other embodiments, a user may help keep the pallet trolley 10 in position under the pallet 56 by using the handle assembly 18 to move and position the pallet trolley 10 while the pallet 56 is being moved.

As shown in FIGS. 11 and 12, the pallet 56 may roll on the ground in a generally perpendicular direction then the axis A-A of the frame 12 of the pallet trolley 10. If it is desired to turn the pallet 56 as the pallet 56 moves with the fork truck 72, a user may manipulate the handle assembly 18 as the fork truck 72 turns the pallet 56 or the pallet trolley 10 may turn itself as the fork truck 72 and pallet 56 turn due to the adhesion between the pallet 56 and the pallet trolley 10 due do the weight of the loaded pallet 56 and/or the gripping projections 42 (see FIG. 10).

While the disclosure has been described in terms of exemplary aspects, those skilled in the art will recognize that the disclosure can be practiced with modifications in the spirit and scope of the appended claims. These examples given above are merely illustrative and are not meant to be an exhaustive list of all possible designs, aspects, applications or modifications of the disclosure.

We claim:

1. A pallet trolley comprising:
a frame having two ends, the frame including an elongated member that defines a longitudinal axis;
a handle assembly attached to the frame;
a first wheel assembly attached to the frame at one end; and
a second wheel assembly attached to the frame at the other end,
wherein the first and second wheel assemblies are oriented to allow the pallet trolley to roll in a direction other than parallel to the longitudinal axis of the elongated member, and
wherein at least 60% of the first wheel assembly is located on a first side of the longitudinal axis while a second side of the longitudinal axis directly opposite the first wheel assembly is devoid of a separate wheel assembly and at least 60% of the second wheel assembly is located on the second side of the longitudinal axis while the first side of the longitudinal axis directly opposite the second wheel assembly is devoid of a separate wheel assembly, the frame and first and second wheel assemblies being configured to stand unsupported when not loaded.

2. The pallet trolley of claim 1, wherein the wheel assemblies are oriented to allow the pallet trolley to roll in a direction perpendicular to the longitudinal axis of the elongated member.

3. The pallet trolley of claim 1, wherein each wheel assembly contains at least two wheels.

4. The pallet trolley of claim 1, further comprising a support plate attached to each wheel assembly.

5. The pallet trolley of claim 4, wherein the support plates are located higher than the frame such that a load placed on the trolley contacts the support plates before the frame.

6. The pallet trolley of claim 4, wherein the support plates have substantially smooth upper surfaces.

7. The pallet trolley of claim 4, further comprising gripping projections located on at least one of the support plates.

8. The pallet trolley of claim 4, wherein at least 60% of a surface area of at least one support plate is located to one side of the longitudinal axis of the frame.

9. The pallet trolley of claim 1, wherein the frame comprises a tubular portion and a flat portion attached to the tubular portion.

10. The pallet trolley of claim 1, wherein the handle assembly includes a T-bar attached to an upright member.

11. The pallet trolley of claim 10, further comprising an attaching plate connected to the upright member.

12. The pallet trolley of claim 11, further comprising fasteners connecting the attaching plate to the frame.

13. The pallet trolley of claim 10, further comprising resilient grips attached to the T-bar.

14. A pallet trolley comprising:
a frame having two ends, the frame including an elongated member that defines a longitudinal axis;
a handle assembly attached to the frame, wherein the handle assembly includes a grip axis that is offset from and substantially perpendicular to the longitudinal axis of the frame;

a first wheel assembly attached to the frame at one end and offset to a first side of the longitudinal axis while a second side of the longitudinal axis directly opposite the first wheel assembly is devoid of a separate wheel assembly;

a second wheel assembly attached to the frame at the other end and on the second side of the longitudinal axis while the first side of the longitudinal axis directly opposite the second wheel assembly is devoid of a separate wheel assembly, wherein the first and second wheel assemblies are oriented to allow the pallet trolley to roll in a direction substantially perpendicular to the longitudinal axis of the frame, the frame and first and second wheel assemblies being configured to stand unsupported when not loaded; and a first and a second support plate located over the first and second wheel assemblies, respectively.

15. The pallet trolley of claim 14, wherein more than 70% of the first wheel assembly is located on one side of the longitudinal axis of the elongated member.

16. The pallet trolley of claim 14, wherein more than 80% of a surface area of at least one of the support plates is located on one side of the longitudinal axis of the elongated member.

17. The pallet trolley of claim 14, further comprising gripping projections located on at least one of the support plates.

* * * * *